United States Patent [19]

Altekruse

[11] Patent Number: 4,494,141

[45] Date of Patent: Jan. 15, 1985

[54] DUAL PURPOSE ARRAY PROCESSOR FOR A CT SCANNER

[75] Inventor: Richard A. Altekruse, Sussex, Wis.

[73] Assignee: General Electric Company, Milwaukee, Wis.

[21] Appl. No.: 428,761

[22] Filed: Sep. 30, 1982

[51] Int. Cl.³ .......................... H04N 7/13; H04N 7/18
[52] U.S. Cl. .................................... 358/111; 358/134; 364/414; 378/19; 378/901; 382/6; 382/56
[58] Field of Search .............. 358/111, 133, 134, 138; 364/414; 378/12, 19, 901; 382/6, 42, 54, 56

[56] References Cited

U.S. PATENT DOCUMENTS

| | | | |
|---|---|---|---|
| 4,114,042 | 9/1978 | LeMay | 364/414 |
| 4,203,035 | 5/1980 | Grenier | 364/414 |
| 4,220,863 | 9/1980 | McBride | 378/19 |
| 4,241,404 | 12/1980 | Lux | 378/19 |
| 4,284,896 | 8/1981 | Stonestrom | 364/414 |
| 4,352,021 | 9/1982 | Boyd | 378/12 |
| 4,398,251 | 8/1983 | LeMay | 364/414 |
| 4,455,609 | 6/1984 | Inamura | 364/414 |

Primary Examiner—Howard W. Britton
Attorney, Agent, or Firm—Leydig, Voit, Osann, Mayer & Holt, Ltd.

[57] ABSTRACT

A CT scanner in which the amount of X-ray information acquired per unit time is substantially increased by using a continuous on X-ray source, and a sampled data system with the detector. Because the detector is of the high resolution variety with more than 500 cells, use of a reasonable sampling rate produces data at a rate faster than can be stored to disk by the system computer. The array processor, which forms a part of the standard CT architecture, is interfaced to the data acquisition system and configured to provide real time filtering of the acquired detector data, the filter serving a compressing function to reduce the data rate to one acceptable by the host computer.

2 Claims, 5 Drawing Figures

DUAL PURPOSE ARRAY PROCESSOR FOR A CT SCANNER

This invention relates to CT scanners and more particularly to the scanner elements used to convert the individual detector readings to a form suitable for processing by the reconstruction computer.

One of the important directions in which CT technology has been advancing is the production of better images, those containing more diagnostically useful information. An important factor in achieving better images is adequate resolution of the detector data itself, which enables the scanner to distinguish slight changes in body absorption with good spatial resolution. In addition, it is also useful to provide fast scan capabilities to minimize artifacts caused by body motion.

Those requirements have a direct impact on the acquisition electronics which convert the signals produced in the detector channels into digital form for processing by the reconstruction computer.

As late as 1981, a successful state of the art scanner had the capability of producing 576 views having 512 channel readings per view in about 9.6 seconds. That system was based on integrating the current produced in each detector cell, with the integrated magnitude then being digitized for use by the reconstruction computer. The X-ray source was pulsed at about a 60 Hz. rate, and the integrator period was set to be slightly greater than the duration of a pulse.

In order to further improve the images produced by that scanner, it would be desirable to increase the rate at which detector data could be acquired. That would allow not only faster scanning speeds, but also gathering of additional information from each scan for reconstructing better images.

In order to gain a significant increase in the rate of acquiring detector information, it is desirable to use a continuous-on (rather than pulsed) X-ray source, and to associate a sampled data system (rather than integrating electronics) with the detector channels. However, using a sampled data system with a modern high resolution detector having a large number of detector channels, raises the possibility of acquiring more data per unit time than can be accepted by the computational system. Typically, during the actual scan cycle, when the X-ray tube is on and the source and detector are rotating about the patient, the acquired data is input to the processor (where it may or may not be subjected to some minor pre-processing), but is promptly written to system disk so as to limit the amount of active computer memory needed for data acquisition. The speed at which the CT computer can write information to disk sets a limiting factor on how quickly data can be acquired. A typical rate using available computers is about 280,000 words per second. Two scanners of concern here have 512 or 736 channels per detector, and it is desirable to sample each of those channels at a one millisecond sampling rate. That produces in the first case a 512,000 word per second data rate and in the second case a 736,000 word per second data rate, both substantially higher than can be accommodated by the reconstruction computer.

In Glover et al. U.S. application Ser. No. 428,771 filed concurrently herewith and assigned to the same assignee as the present invention, there is disclosed and claimed a compensating digital filter which performs a number of functions. It provides amplitude and phase compensation for the analog filters in the data acquisition system to yield a more nearly ideal characteristic. Secondly, the digital filter is actually a plurality of digital filters with different band limiting functions to effectively adjust the composite filter cutoff characteristic to the bandwidth established by each of a plurality of different scanning rotation rates. Finally, that digital filter is capable of compressing the acquired detector data so as to effectively reduce the compressed data rate. For example, when operating in a 2:1 compression mode, the output data rate is effectively half the input data rate. The compression ratio can be selected to decrease the output data rate to a level acceptable to the reconstruction computer. Such digital filtering requires the real time processing of a large amount of data at a rapid rate.

In view of the foregoing, it is an aim of the present invention to accomplish compressive digital filtering of detector data in a CT scanner without substantially increasing the complexity of the processing electronics.

More particularly, it is an object of the present invention to accomplish such digital filtering without adding a dedicated digital filter for the purpose.

Other objects and advantages will become apparent from the following detailed description when taken in conjunction with the drawings, in which.

While the invention will be described in connection with a preferred embodiment, there is no intent to limit it to that embodiment. On the contrary, the intent is to cover all alternatives, modifications and equivalents included within the spirit and scope of the invention as defined by the appended claims.

Figure 1:
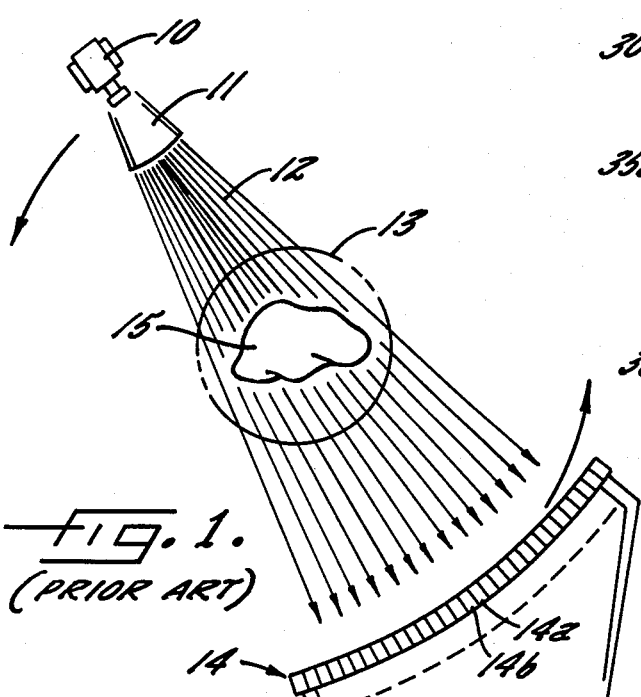
FIG. 1 illustrates a conventional CT architecture.

Turning now to the drawings, FIG. 1 schematically illustrates the major elements of a CT scanner and its associated computational system arranged in a conventional configuration known to the art. The scanner includes a source of penetrating radiation 10, very often in the form of a rotating anode X-ray tube. The radiation produced by the X-ray tube 10 is collimated at 11 to produce a thin fan beam of radiation 12 which is projected through a patient aperture 13 toward an X-ray detector array 14. A body to be examined, such as a patient 15, is positioned within the patient aperture 13 in the path of the fan beam of X-rays 12 such that the beam passing through the body is attenuated in dependence on the density of the objects encountered. As a result, each detector cell 14a, 14b, etc. produces an electric signal which is dependent on the intensity of the radiation received within the cell. Such X-ray readings are taken from each cell at a plurality of angular positions with respect to the patient, as the source and detector array are rotated about the patient aperture.

The readings are digitized in a data acquisition system (DAS) 14x then stored for further processing. Because there is a relatively large amount of data acquired, storage typically takes place on system disk. To that end, during the data acquisition phase of CT operation, a host computer 20 accepts the data from the DAS 14x and promptly writes it to disk 21. After the data is acquired, and during the time the system is computing the image, segments of the data can be retrieved from the disk 21 as necessary. The computed image is then displayed on a CRT 23 under the control of the host CPU 20.

In order to compute images from the raw data in a reasonable amount of time, most modern CT scanners include a special purpose computer shown herein as array processor 22. The array processor is a high speed processor designed to perform computations on arrays of digital numbers in specified ways at a very rapid rate. Most modern CT scanners use convolution and back projection techniques in forming the CT image. The array processor speeds up the Fast Fourier Transform, array multiplication and reverse transform for the convolution operation, as well as the computations used to map the convolved data into pixel space for the back projection. In all cases, however, the environment of the array processor is fairly closely controlled by the host computer 20. The array processor 22 receives its array of data as well as its instructions from the host computer 20, and upon completion of processing passes the results back to the host. While the array processor is well suited to performance of such computations very quickly, it is not particularly suited to the interrupt driven requirements of a data acquisition system.

The CT architecture illustrated in FIG. 1 has been used in connection with a scanner having a 512 channel xenon detector and integrating electronics for digitizing the readings. One view consisting of about 512 readings was produced each 16.7 milliseconds. The host CPU 20 was easily able to receive the data at the rate it was produced and store it on disk 21.

To operate a high resolution detector of that type in a sampled data environment would tend to produce data at a much higher rate. It is not overly difficult to operate a sampling system at about a 1 millisecond sampling rate, which is a useful rate for good high frequency resolution in a CT scanner. However, if the detector has a large number of cells, such as 512 or 736 in the two examples considered here, then there are 512 or 736 digital data words produced every millisecond. The compressive digital filtering process described and claimed in the aforementioned Glover application (the disclosure of which is incorporated herein by reference) manipulates that data to produce an output data rate compatible with the host computer's ability to store it on disk. It appeared, however, that implementation of that technique would require a special high-speed processor interposed between the data acquisition system and the host computer, and configured to the interrupt driven environment of the data acquisition system.

More particularly, the data acquisition system is configured to acquire and digitize a large amount of data at a very rapid rate, but has no provision for storage of that data. Acccordingly, the host computer must respond to an interrupt when the data acquisition system has acquired a view, and must accept that view under control of the data acquisition timing when it is ready. The data acquisition system continues to acquire new views, and if the host is unavailable to store them to disk, the information is simply lost.

While it is possible in theory to simply input the information to the host computer for storage in active memory, as a practical matter considering the amount of data which is produced, that alternative is not viable. Because of the mass of information which is generated, the information must be written to disk as it is acquired. A small block of active memory is set aside to serve as a temporary buffer for information being transferred through the host to disk. However, it is desirable to limit the size of that buffer.

Figure 2:
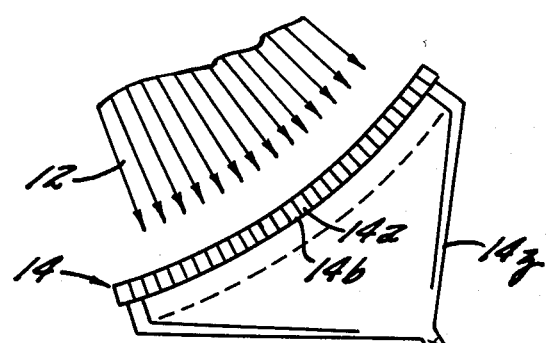
FIG. 2 illustrates a CT architecture according to the present invention.
Figure 2:
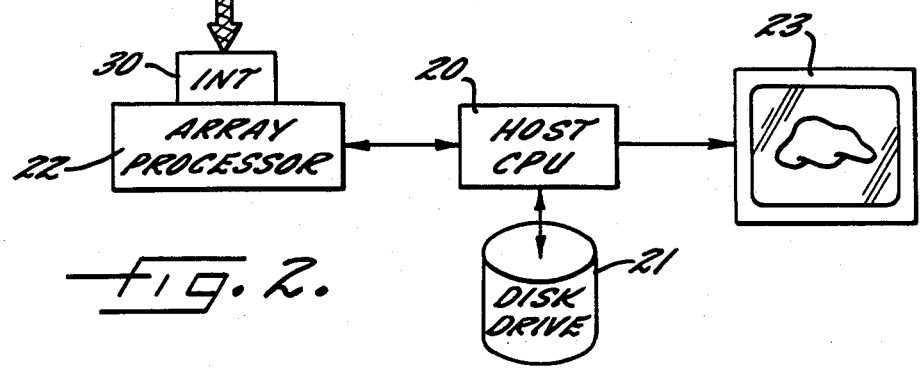

In practicing the present invention, the array processor 22 which is used in the prior art architecture of FIG. 1 in the convolution and back projection portions of the CT operation, is reconfigured as shown in FIG. 2 and interposed between a sampled data data acquisition system 14z and the host computer 20 for real time filtering of the acquired data before transmission to the host computer. Special interface means 30 are associated with the data acquisition system 14z and the array processor 22 as an aid in making the normally non-interrupt driven array processor compatible with the interrupt-driven environment of the data acquisition system. When necessary, special manipulative techniques can be used on the data in the array processor before passing it to the host computer for storage; those techniques are described and claimed in Acharya et al. application Ser. No. 428,458 entitled "Real Time Processing in an Array Processor", filed concurrently herewith and assigned to the assignee of the present application. The disclosure thereof is incorporated herein by reference.

The CT architecture illustrated in FIG. 2 allows the host computer 20 and the array processor 22 to interact in the normal fashion in processing detector data stored on disk 21 to produce CT images for display at 23. However, when the detector data is being acquired, they operate in a new manner in which the array processor 22 performs real time operations on the detector data before transferring them to the host CPU 20. The host in turn uses DMA cycles to transfer the processed data to disk for later processing. In one configuration, the array processor outputs processed data to the host at about 256,000 words per second, while the host uses a DMA rate for output to disk of about 280,000 words per second. The host has a buffer of about 30,000 words to store information during brief intervals where the host is not immediately available to DMA data to the disk.

Figure 3:
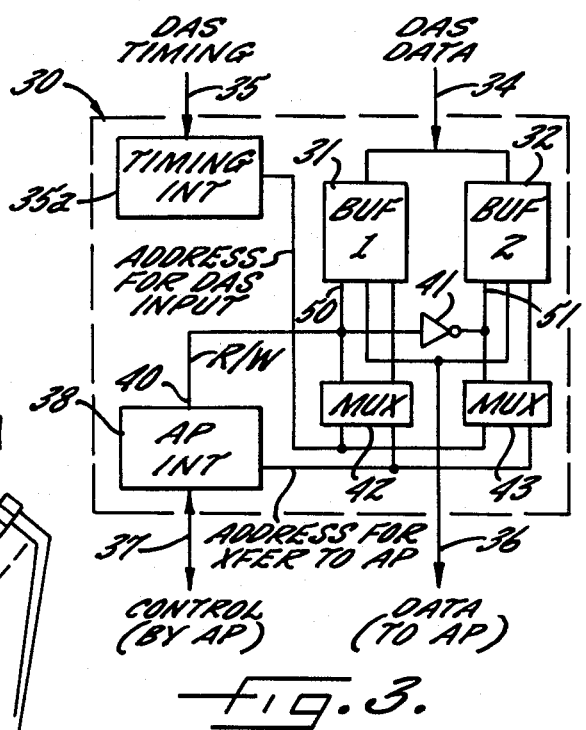
FIG. 3 is a block diagram illustrating the interface portion of FIG. 2.

Turning now to FIG. 3, there is shown additional detail of the interface 30 which is interposed between the DAS and the array processor. A pair of buffers 31, 32 are provided for temporary storage of DAS views before input to the array processor. In one embodiment, the buffers are each capable of storing 1,024 words of 16 bits each. The buffers are made alternately available to the DAS and the array processor; while the DAS is filling one, the array processor is emptying the other. It is not unusual to expect the digital format of the words in the array processor to be different from those used by the DAS; in such cases, a code translator is interposed between the buffer outputs and the array processor input.

The DAS data is input to the interface 30 on a 16 bit bus 34 which is coupled to the input of both buffers 31, 32. Similarly, DAS timing is input on a line 35 to a timing interface 36. A further bus 36 conducts output data from a selected one of the buffers 31, 32 for input to the array processor. In addition, a further bus 37 allows the array processor to control the interface by means of an array processor interface section 38.

The array processor interface section 38 controls the signal level on a read/write line 40 which is used to control the availability of the buffers as well as the addresses for the buffers. It is seen that the read/write line is connected directly to the read/write input 50 of buffer 31, and via an inverter 41 to the corresponding input 51 of buffer 32. Thus, one of the buffers is always available to read data out to the array processor, while the other is available to write data in from the DAS. The multiplexers 42, 43 are also controlled by the read-/write signal and inverted read/write signal so that they are also in opposite conditions. One set of inputs to the multiplexer 42 is derived from the array processor interface 38, and comprises addresses for the data to be transferred to the array processor. In practice, a counter within the array processor interface section 38 simply sequences through the buffer addresses as data is transferred to the array processor. The second set of inputs to the multiplexers 42, 43 is derived from the timing interface 36 and comprises addresses for sequential locations in the buffer for input of data from the DAS. A similar counter within the interface portion accomplishes sequential addressing.

In practice, after the array processor sends a group of instructions to the interface 30 for initial set-up, the data is passed through the interface in accordance with those preset parameters. The buffers 31, 32 are alternatively made available to the DAS for input of data as it is generated, and later made available to the array processor which accepts each view in turn in accordance with its preset sequence. The array processor unloads the buffers in such a way that the danger of losing raw data is minimized. In addition, the compressive nature of the digital filtering process produces an output data rate from the array processor which is compatible with the host CPU's ability to store the data to disk.

As noted in the introduction, the particular digital filter disclosed and claimed in the aforementioned Glover application provides three functions: compensation, band limiting and compression.

With respect to compensation, implementable analog filters are used in the sampling system 14z to filter the detector signals prior to sampling. After digitization, the digital signals are filtered to compensate for the non-ideal characteristic of the analog filter, to produce a composite characteristic which is more nearly ideal.

Figure 4A:
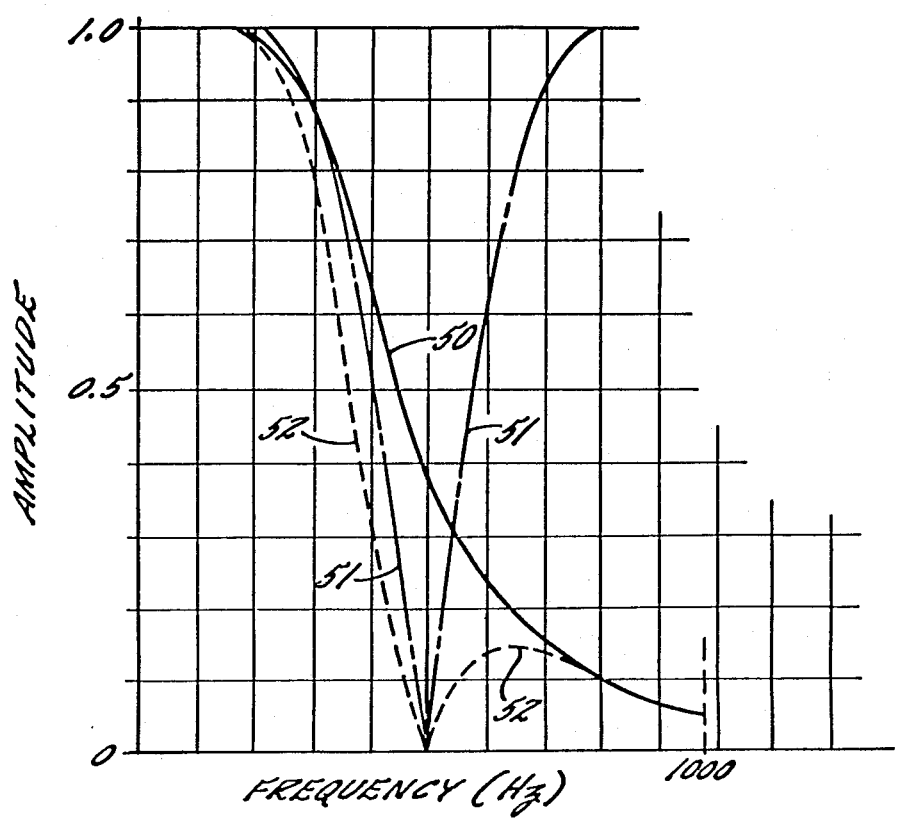
FIGS. 4A and 4B illustrate filter characteristics which can be used in practicing the present invention.

One example of a useful composite characteristic produced by properly coordinating analog and digital filters is illustrated in FIG. 4A. The curve 50 represents the amplitude response characteristic of a 3-pole 380 Hz. Butterworth filter through which the detector signals are passed before sampling. The output of the analog filter is sampled at 1000 Hz, rate and digitized. In one application, the resulting digital data are filtered with a four-term digital filter. The amplitude response of the digital filter is shown by curve 51 in FIG. 4A. The curve 52 shows the combined response. It can be seen that the composite response has a steeper roll-off than the analog filter alone.

Figure 4B:
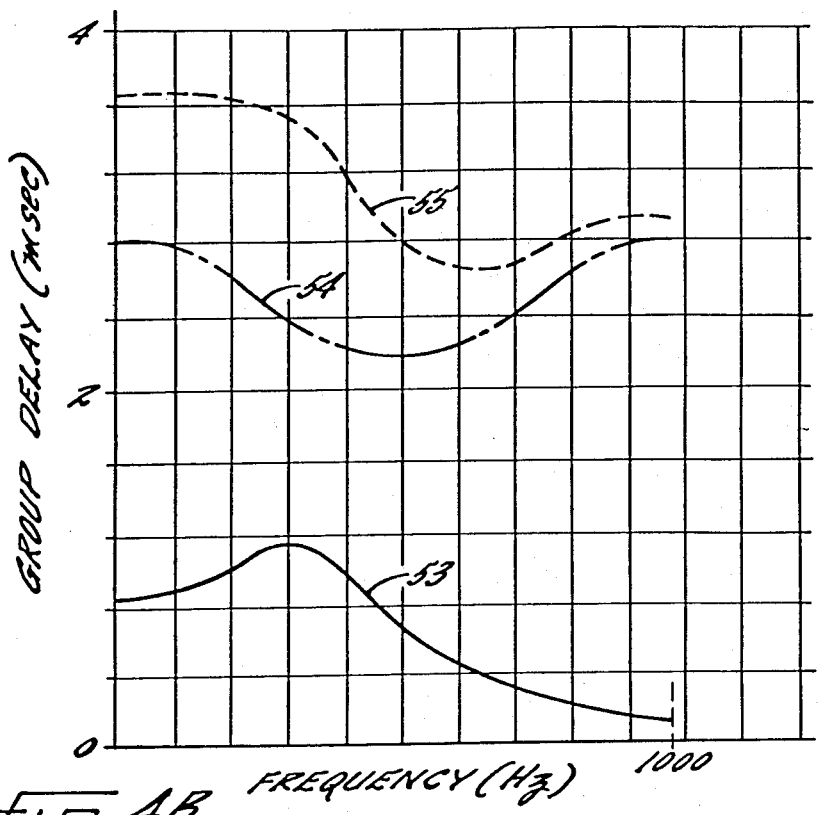

Curve 53 in FIG. 4B shows the group delay for the 380 Hz. 3-pole Butterworth filter. For applications such as this one, overall delay is not critical, but it is desirable to have the group delay be flat. The group delay of the digital filter compensates the analog characteristic to produce a flatter composite group delay. The group delay for the digital filter is shown by curve 54, and curve 55 shows the composite group delay. It is seen that the digital filter has flattened the group delay, particularly at the lower frequencies.

FIG. 4A illustrates the characteristics of the analog, digital, and composite frequency responses, and the following will describe the process by which the characteristic of the digital filter was matched to that of the analog filter. For a comparatively short filter, it is preferable to establish a set of constraints and use those constraints to calculate the filter coefficients directly. A useful set of constraints are that the filter be normalized (i.e., that the coefficients add to 1), that the composite response at the cutoff frequency be zero, and that the composite characteristic be maximally flat at the origin. In order to compensate for phase delay in the analog system, it is also useful to require a symmetric impulse response for the total filter. Using those constraints and the 380 Hz. Butterworth filter for design of a four-term compensating digital filter, yields the coefficients (0.036, −0.188, 0.464, 0.688). In the case of longer digital filters, it is sometimes found more convenient, rather than calculating filter coefficients directly as above, to use inversal design techniques as described in the literature, such as "Digital Signal Processing" by A. V. Oppenheim and R. W. Schafer published by Prentiss Hall 1975 (p. 132).

The digital filter, in addition to providing the compensating functions described above, also performs data compression to produce an output data rate more compatible with the host computer. For example, when operating in the fast scan mode (i.e., two seconds), the above described four-term digital filter is used. Four views are loaded into a buffer for processing and the filter applied to each channel of those four views to produce one output view. Rather than increment the filter along the views by one view as would be conventional, the filter instead is incremented by two views and the process repeated. Thus, for each two input views only one output view is produced in effect "compressing" the data to produce a slower output data rate. An eight-term filter is also provided for use in a 4:1 data compression mode. In that case, eight views must be loaded into a buffer for processing in order to produce an output view. But after the output view is produced, the filter is incremented by four views. As a result, for each four input views only one output view is produced, achieving a 4:1 data compression. Twelve term and sixteen term filters have also been used for 6:1 and 8:1 compression rates respectively.

Finally, while the same analog filter is used for all scan speeds of the scanner, a different digital filter is applied for each different scan speed to serve a band limiting function. The 1,000 Hz. sampling rate remains constant, and insures no loss of information due to the sampling process. The bandwidth of the analog filter is slightly higher than that necessary for a 2 second scan, and it has reasonably good though not perfect amplitude and phase response at the frequencies of interest. Each of the digital filters (in the present example 4) is chosen to have a bandwidth matched to the scan speed, to adjust for any inadequacies in the analog response within the associated pass band and the data rate is reduced appropriately after the digital filtering step. In addition, it is desirable that the filter be easily implemented with short computation times.

Taking the 4 second scan mode as an example, the frequencies of interest are those present between 0 and 125 Hz. The broad band detector data (and noise) is band limited by the analog filter and sampled at a 1,000 Hz. rate. In the case of the 4 second scan, an eight-term digital filter is used (in contrast to the four-term filter used in the 2 second scan mode) and that serves to adjust the combined filter characteristic to provide a 125 Hz. cutoff. Samples are taken every millisecond by the sample and hold circuitry and passed to the digital filter which is operated in a 4-to-1 data compression mode to produce an output sample every 4 milliseconds (250 Hz.). In a similar fashion, the 3 second scan mode uses a six-term filter and operates in a 3-to-1 data compression mode. The 8 second scan mode uses a sixteen-term filter and operates in an 8-to-1 data compression mode.

Since it is a relatively easy matter to store four such digital filters, and to select the proper one dependent on scan mode, the system not only achieves an improved filter characteristic, but tailors the characteristic to the scan mode being used and does so in a practical manner which can be directly implemented at an affordable price.

As noted above, in normal use the array processor environment is closely controlled by the host CPU, whereas that cannot be the case during data acquisition in the FIG. 2 architecture. In normal use of the array processor, an array or some portion thereof is designated for processing, then passed to the array processor which performs the specified computation, then returns computed results to the host computer. When using very high data rates, that procedure is not directly applicable for the real time processing described herein. Instead, the processing procedure described and claimed in the aforementioned Acharya et al. application is utilized.

Briefly, that technique is based on the realization that the filtering process required by the instant invention is non-recursive in nature. As such, it is not necessary to have access to all of the data for an array before beginning a computation. Accordingly, it has been discovered that the processing and input/output functions can be intermixed in a fashion which allows the system to both acquire and process the data at the relatively high real time data rates considered herein.

In performing the digital filtering operation, the sets of data (i.e., views) are acquired in sequence, but the process is performed not along a view, but across a number of views. Taking an example, consider a system operating with a one millisecond sample rate, using an 8-term digital filter and desiring a 4:1 compression ratio to reduce the data rate by a factor of 4.

First of all, before processing can begin, it is necessary to load the first eight views into the array processor. Following that, processing and input/output are interchanged to accommodate the real time data rate. It was discovered that if a fractional portion of the set of views were filtered, the fraction being the inverse of the compression ratio, the processing time for each fractional portion could be adjusted to the data rate such that the array processor was made available to empty each buffer just after it was filled by the DAS. As a result, it is possible to operate the interface with only two buffers and to manage the processing as well as the input/output tasks in real time and without loss of data.

With the exemplary compression ratio of 4, the fractional portion of the stored channels is set at ¼, such that it takes four "passes" to filter a complete set of eight views. Thus, immediately after the first eight views are loaded into the array processor, and while the ninth view is being loaded into one of the buffers in the interface 30, the array processor performs the digital filtering operation on the first quarter of the channels of the eight views in its memory. The processed results for those channels can be temporarily stored in the array processor but are output as time is available to the host computer. The processing rate is made fast enough so that by the time the first quarter of the channels are computed, the DAS has loaded the ninth view into its buffer in the interface. Thus, the array processor toggles the interface to make the alternate buffer available to the DAS, and to unload the ninth view into its memory and hold it for later processing. The array processor then returns to processing the first eight views, but this time filters the second quarter of the channels. The results are output to the host as time becomes available. However, by the time the processor has completed processing of the second quarter of the views, the tenth view is available to it in the interface 30. The buffers in the interface are toggled so that the eleventh view can be acquired from the DAS, and the tenth view loaded into array processor memory for later use. The array processor returns to process the third quarter of the first eight views while the DAS is transferring the eleventh view to the interface buffer. In similar fashion, the eleventh view is loaded into the array processor when it becomes available, the final quarter of the first eight views are processed, then the twelfth view is loaded into the array processor. At that time, the array processor has output one complete view by filtering eight sets of views from the DAS, has output the results to the host at a rate compatible with the host, and has additionally input the next four views (ninth through twelfth) into its own memory. Thus, views 1 through 4 can be disposed of, and the process again performed on views 5 through 12. That process is repeated until all the views are filtered, and output to the host for storage on the disk.

While it is certainly possible to build a special processor which is both very fast and also amenable to an interrupt environment, it is believed that the ability taught herein to harness the power of a CT array processor represents a significant technological as well as economic advantage. The array processor remains fully available to perform its usual functions in the image reconstruction process, and additionally brings its significant computational powers to bear for the data acquisition operation at moderate additional cost.

I claim as my invention:

1. In a CT scanner having a host computer and an array processor interconnected to cooperate in producing CT images from acquired detector data, the improvement comprising, a data acquisition system associated with the detector and having the ability to produce detector data at a rate faster than the maximum continuous input data rate of the host computer, means interfacing said array processor to the data acquisition system including timing means controllable by the data acquisition system at its data rate and control means for responding to array processor instructions, digital filter means in the array processor for compressing the data acquisition system data to produce a filtered data rate compatible with the host computer, and means for transferring the compressed data to the host computer for storage and further processing.

2. The improvement as set out in claim 1 wherein the interface means includes a pair of view buffers, and means making the view buffers alternately available to the data acquisition system and the array processor.

* * * * *